(12) United States Patent
Teale et al.

(10) Patent No.: US 11,697,181 B2
(45) Date of Patent: Jul. 11, 2023

(54) FUSIBLE METAL CLAY, STRUCTURES FORMED THEREFROM, AND ASSOCIATED METHODS

(71) Applicant: Weatherford Technology Holdings, LLC, Houston, TX (US)

(72) Inventors: David W. Teale, Spring, TX (US); Michael T. Smalley, Katy, TX (US); Richard S. Green, Cypress, TX (US); William R. Howie, Katy, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 837 days.

(21) Appl. No.: 16/773,766

(22) Filed: Jan. 27, 2020

(65) Prior Publication Data

US 2021/0229225 A1 Jul. 29, 2021

(51) Int. Cl.
*B23P 15/34* (2006.01)
*B23K 35/02* (2006.01)
*B23K 35/30* (2006.01)
*B23K 35/36* (2006.01)
*B23K 35/22* (2006.01)
*B23K 11/30* (2006.01)
*B23K 103/00* (2006.01)
(Continued)

(52) U.S. Cl.
CPC ............. *B23P 15/34* (2013.01); *B23K 11/30* (2013.01); *B23K 35/0211* (2013.01); *B23K 35/228* (2013.01); *B23K 35/302* (2013.01); *B23K 35/3601* (2013.01); *B23K 2101/20* (2018.08); *B23K 2101/35* (2018.08); *B23K 2103/12* (2018.08); *B23K 2103/30* (2018.08); *B23K 2103/50* (2018.08)

(58) Field of Classification Search
CPC ..... B23P 15/34; B23K 11/30; B23K 35/0211; B23K 35/228; B23K 35/302; B23K 35/3601; B23K 2101/20; B23K 2101/35; B23K 2103/12; B23K 2103/50; B23K 2103/30
See application file for complete search history.

(56) References Cited

U.S. PATENT DOCUMENTS 5,908,071 A 6/1999 Hutchinson et al.
10,167,690 B2 1/2019 Haq et al.
(Continued)

OTHER PUBLICATIONS

Brazelet, "Complete Brazing Solutions for your Brazing Needs," Segment-brochure 1494HOG, May 2016, 8 pages.
(Continued)

*Primary Examiner* — Omar Flores Sanchez
(74) *Attorney, Agent, or Firm* — Cabello Hall Zinda, PLLC

(57) ABSTRACT

Structures for a tool surface of a downhole tool are constructed from a metal clay molded in a wet state. The wet state clay is a workable combination that can have a braze alloy grain, a tungsten carbide grain, and a binder. Additional cutting inserts can be embedded in the molded clay. Heat treatment applied to the molded metal clay causing the binder to be combusted and consumed. The braze alloy melts and then cools into a fused state with the tungsten carbide grain therein. The structure can affix to the tool surface of the tool by first being fused and then attached by brazing to the tool. Alternatively, the structure can be positioned in a fusible state adjacent the tool surface. When the heat treatment is applied, the structure fuses together and forms a metallurgical bond with the tool surface of the tool.

20 Claims, 8 Drawing Sheets

(51) Int. Cl.
　　　*B23K 101/34*　　　(2006.01)
　　　*B23K 101/20*　　　(2006.01)
　　　*B23K 103/12*　　　(2006.01)

(56) References Cited

U.S. PATENT DOCUMENTS

| | | |
|---|---|---|
| 2008/0035377 A1 | 2/2008 | Sullivan et al. |
| 2015/0101812 A1 | 4/2015 | Bansal et al. |
| 2015/0322741 A1 | 11/2015 | Badrak |
| 2016/0201416 A1 | 7/2016 | Gendre et al. |

OTHER PUBLICATIONS

Brazelet, "F300P-9011 Screen Printing Thick Layers," Brochure 1402HOG, Mar. 2016, 1 page.

Brazelet, "Ni2DW-9201 Dispensing," Brochure 1414HOG, Mar. 2016, 1 page.

Weatherford, "Endura Dual-String Section Mill—Set a rock-to-rock barrier and know that it's done right," Brochure 12652.00, 2017, 8 pages.

Virtus Resins, "Stone-Binder Polyurethane System Flowbind (UVR)," Brochure, 4 pages.

Hydropulsion, "Milling Tools," Brochure, 4 pages.

Hoganas, "Induction Brazing," Datasheet 2312HOG, Aug. 2018, 2 pages.

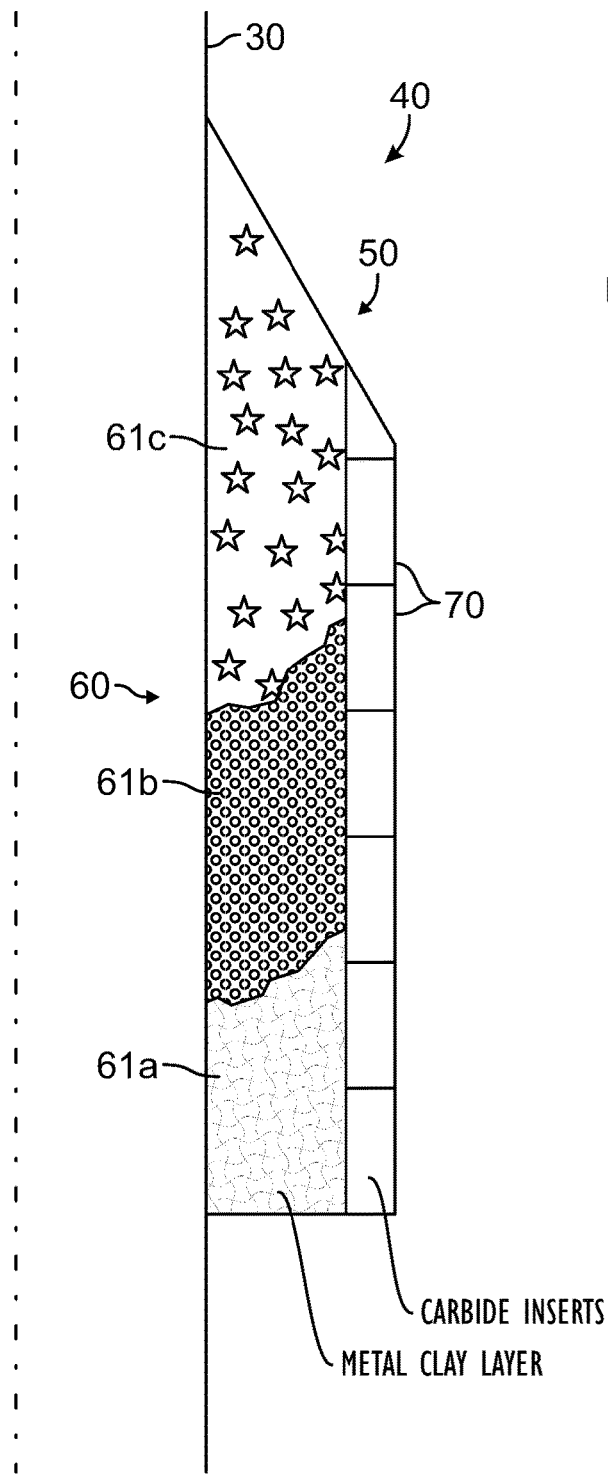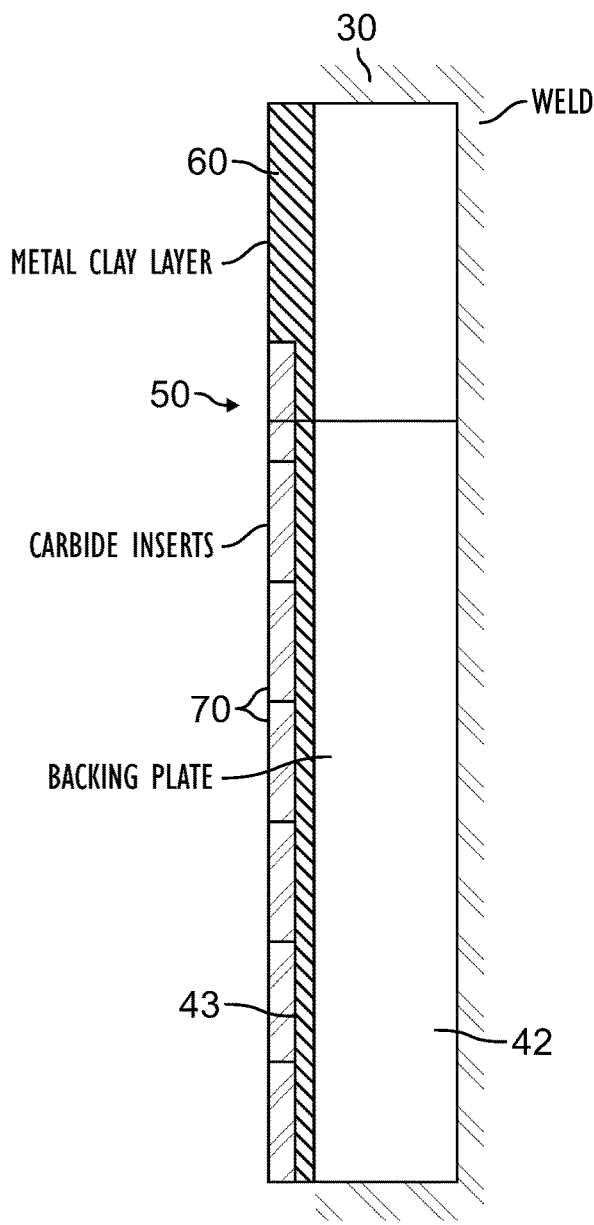
FIG. 4A
FIG. 4B

FUSIBLE METAL CLAY, STRUCTURES FORMED THEREFROM, AND ASSOCIATED METHODS

BACKGROUND OF THE DISCLOSURE

In a wellbore, there are times when a cutting or milling tool is run downhole to cut or mill elements. For example, a cement plug may be set in the wellbore to plug and abandon the wellbore. When there are two adjacent casing strings lining the wellbore, the cement plug can be set by cutting a window in each of the adjacent casing strings with a cutting tool. Then, cement is squeezed into the windows to provide a seal.

At other times, a tool can be used to mill out a section of casing, such as when running a whipstock to begin a sidetrack of a wellbore. In plug and perf operations, a milling tool is used for milling out plugs set in the casing.

Cutter tools, mill tools, and the like usually have blades. A cutting portion of the blades can include a number of cutting inserts composed of suitable materials, such as tungsten carbide, for cutting downhole elements, such as steel tubulars and the like. The cutting elements are bonded to a portion of the blade, such as a backing plate, using a brazing operation. The cutting elements can be arranged on various surfaces, can be tiered, can be stacked, can be arranged in rows, etc.

Typically, cutting elements are manually applied by hand in the brazing operation. Common brazing practices include induction heating, furnace brazing, and torch applied brazing applications. The torch applied brazing is commonly used for dressing downhole tools, such as a cutter or mill tool. Various cutting materials and products available to dress tools that include composite rods, wire, and loose inserts similar to machine tool inserts in grade, material properties, and shape. Inserts are classified as metal cutting, formation cutting, etc.

As can be appreciated, application of cutting elements is a labor-intensive process that requires careful "hand craftsmanship." For example, welders must preheat the blade or portion to be dressed, "tin" the surfaces for application, and apply the composite materials for the cutting element. Typically, the welder melts the tungsten carbide composite rod as the material is applied to the surface of the tool or blade. The composite rod can include tungsten carbide chips suspended in a nickel silver matrix. Welders can also place and braze larger tungsten carbide inserts on the tool or blade.

During this process, the tungsten carbide components are manually oriented for maximum cutting performance. This process is repeated multiple times to produce a fully dressed mill or cutting blade. Time varies depending on the material applied and the surfaces to be covered, but it is not uncommon that dressing a single mill can take more than eight hours.

Cladding materials can also be used to dress cutters and mills on downhole tools to improve cutting. For example, one type of cladding material, known as SUPERLOY™, is composed of crushed sintered-tungsten particles suspended in a copper-based brazing-type alloy having a high nickel content. (SUPERLOY is a trademark of Baker Hughes Incorporated.) In another example, US20160201416A1 discloses the use of a powder cladding material to dress the blades of a tool and bond cutting inserts.

Although techniques for manufacturing blades for cutter and milling tools may produce effective blades for cutting and milling, the techniques can require a great deal of time and attention to detail to produce the blades. The subject matter of the present disclosure is directed to overcoming, or at least reducing the effects of, one or more of the problems set forth above.

SUMMARY OF THE DISCLOSURE

According to the present disclosure, a method of overlaying a downhole tool for engagement downhole is disclosed. The overlaying in the disclosed method can involve dressing a surface, adding a layer, adding a component structure, or making an integral part or structure of a downhole tool or a portion thereof. In one example, the overlaying may involve overlaying the downhole tool for abrasive engagement, such as dressing a downhole tool, blade, or the like with cutting structures.

The method comprises: (i) molding a clay in a wet state into a structure, the clay in the wet state being a workable combination comprising a first grain, a second grain, and a binder, the first grain comprising a metal alloy having a first hardness and a first melting point, the second grain comprising a second material, the second material having a second hardness greater than the first hardness of the metal alloy and having a second melting point higher than of the first melting point of the metal alloy, the binder binding the first and second grains into the workable combination and having a combustion temperature at least not greater than the first melting point; and (ii) affixing the structure to the downhole tool by: (a) positioning the structure in a fusible state adjacent the downhole tool; (b) applying a heat treatment to the structure at least up to the first melting point; (c) fusing the structure together with the applied heat treatment; and (d) forming a metallurgical bond between the structure with the downhole tool with the applied heat treatment.

The first grain can comprise the metal alloy comprises a powder comprising: a braze alloy; an alloy of nickel, copper, and cobalt; an alloy of copper and nickel; or a CuNi10 alloy with 90% copper and 10% nickel. The second grain can comprise a powder, frit, pieces, chips, fragments, particles, shapes, elements, chunks, or combination thereof having the second material. The second material can comprise interstitial carbide, tungsten carbide, titanium carbide, polycrystalline diamond compact, diamond powder, abrasive material, cubic boron nitride, steel, or combination thereof.

The binder can comprise a synthetic binder, an organic binder, a water-based binder, a polyurethane-based binder, an adhesive, a glue, or a combination thereof. The clay can further comprise a flux agent, which can comprise a powder having borax.

In the method, a level of plasticity for the workable combination depends on a particle size, a percentage by volume, and a particle wettability of at least one of the first and second grains relative to one or more characteristics of the binder.

In molding the clay in the wet state into the structure, the method can comprise forming the clay in the wet state in a mold, injecting the clay in the wet state from a piston, or manually forming the clay in the wet state. Molding the clay can further comprise allowing the molded clay to dry from the wet state to a dry state; and further machining or shaping the molded clay in the dry state.

In the method, molding the clay can further comprise embedding one or more prefabricated cutting elements in the molded clay. The one or more prefabricated cutting elements can comprise one or more inserts composed of tungsten carbide.

In applying the heat treatment to the molded clay at least up to the first melting point, the method can comprises applying the heat treatment with induction heating, torch heating, furnace heating, resistance welding, or combination thereof. Cooling the fused structure can comprise cooling to a relief temperature, holding the relief temperature for a time period, and subsequently cooling below the relief temperature.

In the method, positioning the structure adjacent the exterior of the downhole tool can comprise tinning a substrate surface of the exterior of the downhole tool; and placing a base surface of the structure adjacent the tinned substrate surface.

In the method, applying the heat treatment to the structure at least up to the first melting point can comprise applying induction heating, applying torch heating, furnace heating, resistance welding, or a combination thereof.

In the method, applying the heat treatment to the structure at least up to the first melting point can comprise applying resistance welding by scanning the structure with a conforming electrode. Scanning the structure by the conforming electrode can comprise producing a continuous arc for fusing by: moving the conforming electrode having a carbon fiber brush, a compliant conductive material, and/or a conductive fluid across an irregular surface of the structure; and maintaining electrical continuity between the conforming electrode and the irregular surface as the conforming electrode moves across the irregular surface.

In the method, affixing the structure to the downhole tool can comprise: constructing the structure as a blade or portion thereof on the downhole tool selected from the group consisting of a cutting tool, a section mill, a milling tool, a junk mill, a casing window mill, a liner mill, a casing exit tool, and a thru-tubing mill; or constructing the structure as a component or portion thereof on the downhole tool selected from the group consisting of a drill, a bit, a stabilizer, a shoe, a reamer, a washover shoe, a wear pad, and an under-reamer.

According to the present disclosure, a method of overlaying a downhole tool for abrasive engagement downhole comprises: (i) molding a clay in a wet state into a structure, the clay in the wet state being a workable combination comprising a first grain, a second grain, and a binder, the first grain comprising a metal alloy having a first hardness and a first melting point, the second grain comprising a second material, the second material having a second hardness greater than the first hardness of the metal alloy and having a second melting point higher than of the first melting point of the metal alloy, the binder binding the first and second grains into the workable combination and having a combustion temperature at least not greater than the first melting point; (ii) fusing the structure by applying a heat treatment to the molded clay at least up to the first melting point; (iii) cooling the fused structure; and (iv) attaching the fused structure to the downhole tool.

Again, the overlaying in the disclosed method can involve dressing a surface, adding a layer, adding a component structure, or making an integral part or a component of a downhole tool or a portion thereof. In the method, attaching the fused clay structure to the downhole tool can comprise at least one of: constructing a blade on the downhole tool by brazing the fused clay structure to a surface of the blade on the downhole tool; constructing a blade on the downhole tool by brazing the fused clay structure to a surface of the downhole tool as a primary structure for the blade; and attaching the fused clay structure to a surface of the downhole tool with a brazing paste, an adhesive, a fixture, or combination thereof.

Further features of this method can include those of the former method.

The present disclosure also discloses a downhole tool dressed by a method according to the steps disclosed above.

The foregoing summary is not intended to summarize each potential embodiment or every aspect of the present disclosure.

BRIEF DESCRIPTION OF THE DRAWINGS

FIG. 4A illustrates a detailed view of a face of a blade according to the present disclosure for a cutting tool.

FIG. 4B illustrates a detailed view of an outer edge of the disclosed blade for the cutting tool.

DETAILED DESCRIPTION OF THE DISCLOSURE

Figure 1:
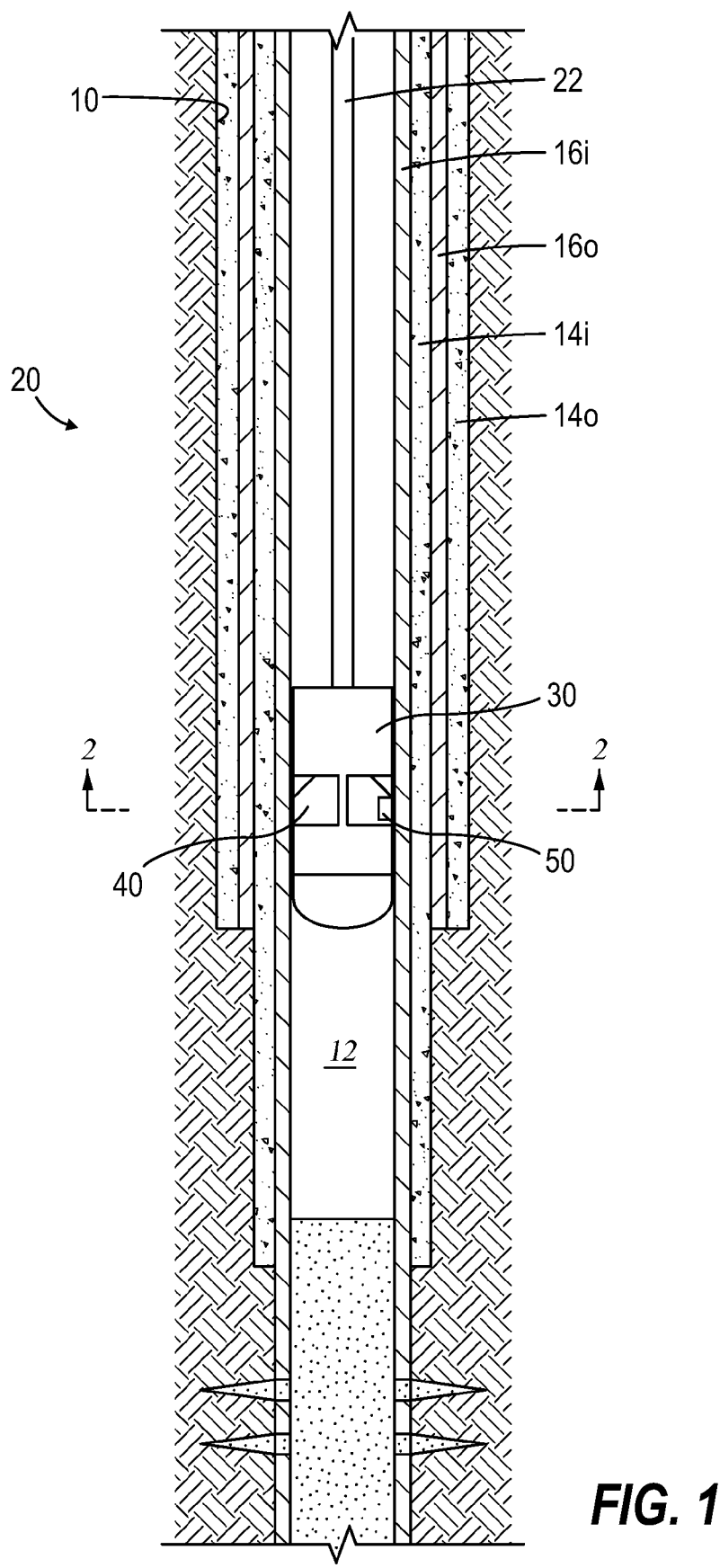
FIG. 1 illustrates a system for cutting a tubular in a wellbore as an example of the present disclosure.

FIG. 1 illustrates a system 20 for cutting a tubular in a wellbore 10. An exemplary system is disclosed in U.S. Pat. No. 10,167,690, which is hereby fully incorporated by reference. The wellbore 10 includes at least one tubular, such as an inner tubular 16*i* and an outer tubular 16*o*, which can include casing, liner, or other suitable wellbore tubulars used in the art. The outer tubular 16*o* can be cemented with outer cement 14*o* into the wellbore 10, and the inner tubular 16*i* can be hung from a wellhead and cemented with inner cement 14*i* into place.

The system 20 can include a conveyor string 22 with a bottom hole assembly (BHA) at a lower end thereof. The BHA includes a rotatable cutting assembly or tool 30 having blades 40. The cutting tool 30 can be a section mill, a milling tool, a junk mill, a casing window mill, a liner mill, a casing exit tool, a thru-tubing mill, and the like. The blades 40 include one or more cutting structures 50 according to the present disclosure. Although disclosed with reference to blades 40 or portions thereof for the cutting tool 30 of a section mill, the cutting structures 50 of the present disclosure can be used to overlay or dress other tools for additional purposes of abrasive engagement downhole. In general, the cutting structures 50 can be used to overlay or dress milling tools, drilling tools, reaming tools, drilling bits, milling bits, stabilizers, shoes, reamers, washover shoes, wear pads, under-reamer, and the like for abrasive engagement downhole.

Figure 2:
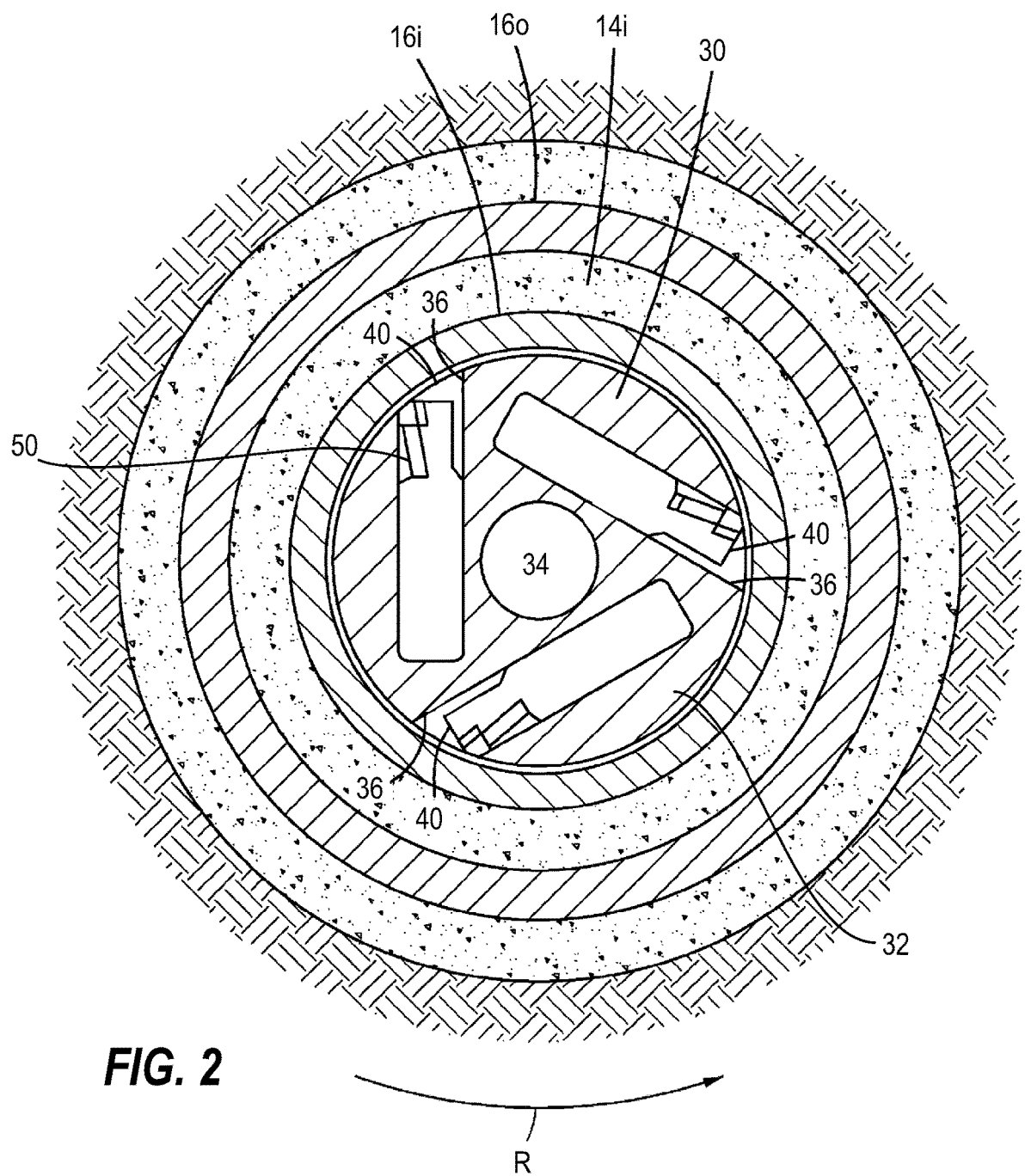
FIG. 2 illustrates a bottom up view of a cutting tool of FIG. 1.

FIG. 2 illustrates a bottom-up view of the cutting tool 30, namely a section mill as an example. The inner and outer tubulars 16i-o may or may not be concentrically arranged. The cutting tool 30 includes a housing 32 with a housing bore 34 and having one or more blades 40 (three shown) disposed in respective pockets 36 in the wall of the housing 32. Each pocket 36 may be eccentrically arranged relative to a center of the cutting tool 30. Each blade 40 may have an eccentric extension path relative to the center of the cutting tool 30, resulting in a larger available blade sweep than a radially arranged blade. The cutting tool 30 may rotate with respect to inner and outer tubulars 16i-o. The direction of rotation R distinguishes the leading face or surface of the blades 40 from the trailing face or surface.

Activation of the tool 30 extends the blades 40 radially outward. For example, pistons in the tool 30 can push the blades 40, which then extend outside the pockets 36. With the cutting tool 30 rotating and in contact with the tubulars 16i-o or other item, one or more cutting structures 50 of the blades 40 begin to mill away the item (i.e., casing, cement, etc.). The cutting may wear away the blades 40 during milling. For this reason, the blades 40 preferably have a geometry that resists wear and disperses the cutting forces.

As noted in the Background, traditional mill blades have a metal backing plate. The plate can have a composite crushed carbide from a composite rod applied to it, and inserts can be applied to one primary face and optional secondary faces. The cutting elements 50 of the present disclosure are formed from a molded element of a fusible metal clay. The cutting structures 50 may be affixed to a backing plate, but the cutting structure may eliminate the need for a backing plate altogether by becoming the primary structure for support and cutting.

Figure 3:
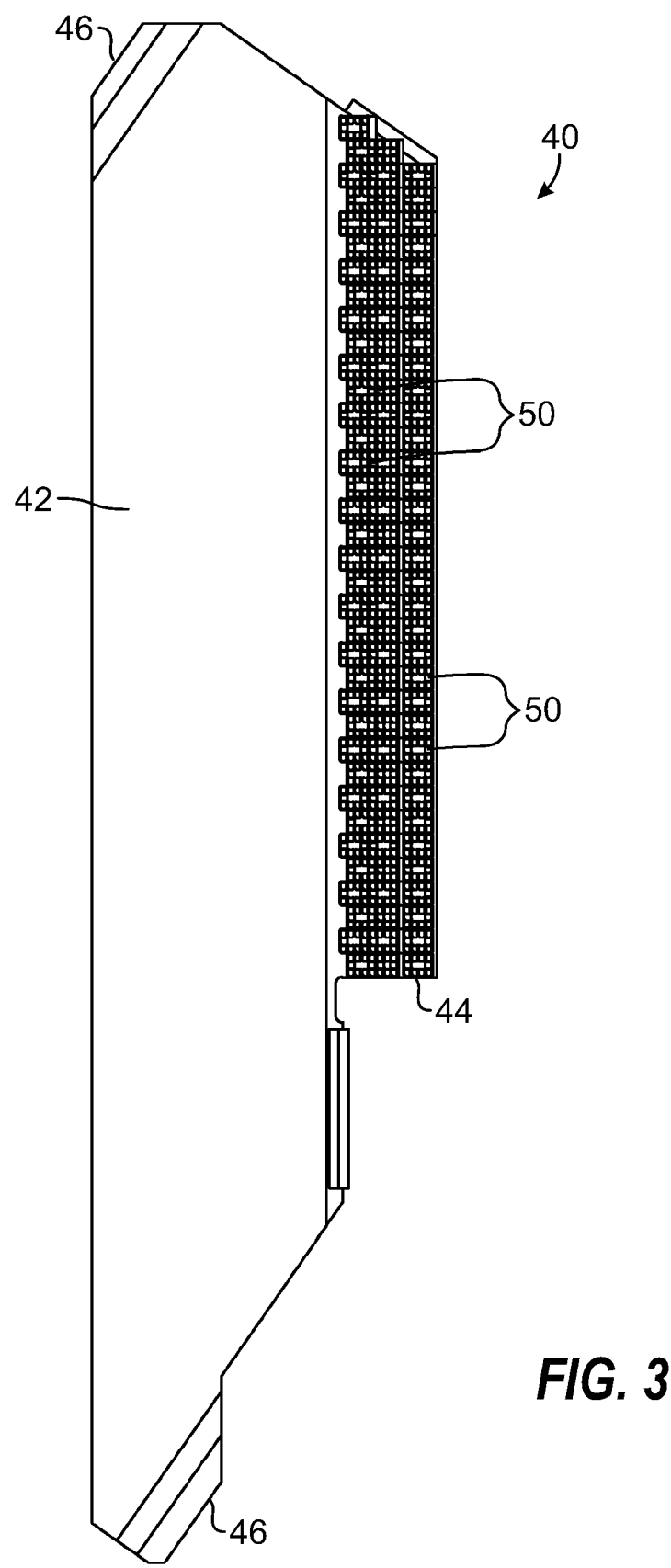
FIG. 3 illustrates an isolated view of a blade for the cutting tool of FIG. 2.

As illustrated in an isolated plan view in FIG. 3, a blade 40 for a section mill includes a body 42 having a cutting portion or protrusion 44. Here, the body 42 includes angled tracks 46 on the ends, which allow the blade 40 to be extended and retracted out from the pocket (36) of the tool's housing (32). Of course, other arrangements for the blade 40 can be used, such as a fixed blade disposed on a cutting assembly.

The blade 40 can include one or more cutting structures 50 having appropriate materials (e.g., tungsten carbide) suitable for cutting tubular material (e.g., steel). The cutting structures 50 may be affixed or bonded to the protrusion 44 of the blade's body 42, or the cutting structures 50 may form the protrusion 44 or portion thereof, being affixed or bonded to the body 42.

For example, the cutting structures 50 can be fused or attached to the blade 40 and can include hardened inserts. The process of fusing or attached the cutting structures 50 can heat the blade 40 to such a temperature that the strength or ductility of the blade 40 could be compromised. Therefore, depending on the circumstances, additional heat treatment steps may be required to ensure suitable working life.

In one embodiment, the one or more cutting structures 50 can be independently purposed and arranged on various surfaces of the blade 40. For instance, a plurality of the cutting structures 50 may be arranged in tiers, rows, and the like on the blade 40 and may be arranged on a leading side, a trailing side, edges, and the like of the blade 40. Overall, the arrangement of the cutting structures 50 can be configured to initiate a cut in a tubular, cut axially downward along the length of the tubular, and the like.

As noted in the Background, there is a need to streamline the process used to manufacture and dress blades 40 for cutting tools, milling tools, and the like. To accomplish this, a process is disclosed herein where a cutting structure 50, a portion of a blade 40, or an entire blade 40 are formed by a fusible molded clay.

FIG. 4A illustrates a detailed view of a face of one embodiment of a blade 40 for a cutting tool 30. The blade 40 here is a section mill blade, such as used on a section mill. FIG. 4B illustrates a detailed view of an outer edge of the blade 40.

The blade 40 includes a backing plate 42 made of a suitable steel material, welded or otherwise affixed to a portion of the tool 30. A cutting structure 50 is affixed to the backing plate 42, such as on a leading face 43 of the plate 42. The cutting structure 50 includes a fused metal clay layer 60 and can include one or more embedded cutting inserts 70.

The fused layer 60 is produced from a fusible metal clay as discussed below that is fused to the surface 43 of the backing plate 42. Overall, the fused layer 60 can include a metal alloy impregnated with a hard abrasive grain of different sizes, such as powder, chunks, pieces, or a combination thereof. The one or more cutting inserts 70 can be inserts of a hard material embedded and fused in the fused layer 60. For example, these inserts 70 can be tungsten carbide inserts and can be disposed at the leading edge of the blade 40.

In one example, the fusible metal clay for the layer 60 can be composed of alloying elements, tungsten carbide filler, a binder, and optional flux agent. Different organic and synthetic binders and flux agents can used depending on the application. The metal alloy composition is tailored to the application, and the clay is given enough plasticity to hold shape for the molding application at hand.

The cutting structure 50 having the fused layer 60 and inserts 70 can be pre-formed in an unfused state and can be fused directly to the surface 43 of the backing plate 42. Alternatively, the cutting structure 50 having the fused layer 60 and inserts 70 can be pre-formed in an unfused state, can be fused as a fused structure, and then can be affixed to the surface 43 of the backing plate 42 using brazing or the like. Either way, the cutting structure 50 facilitates assembly of the blade 40 by eliminating the need for manual manipulation and brazing of individual cutting pieces to surfaces of a blade. Instead, the disclosed cutting structure 50 is pre-defined as a molded product to be readily fusible to surfaces of a blade or tool. Such readily-fusible cutting structures 50 would eliminate significant manufacturing costs and allow for higher production rates with minimal product variation.

The process of preparing the blade 40 with the cutting structure 50 can be semi-automated. For example, an operator can apply a pre-defined molded structure 50 to the backing plate 42 and can fuse the structure 50 in place in a heating operation. Different geometries for the molded structure 50 can be produced for various cutting structures and shapes. Each molded structure 50 would provide a high level of consistency.

As will be discussed in more detail below, for example, the cutting structure 50 is formed from a moldable metal clay, which is applied to the blade 40 or other geometry. The cutting structure 50 is then fused with heat to provide a cutting or wear surface.

In one embodiment, the moldable metal clay can include a braze alloy powder, a tungsten carbide powder, and a flux powder of various percentages and particle size. Moldable consistency is achieved by adding a green state binder to the powder mixture until a moldable consistency is achieved. The moldable metal clay can be molded to shape and allowed to dry. Larger carbide pieces, inserts, or the like can be added to the clay while in its "wet" condition to enhance the cutting or wear resistance properties.

Once formed, the molded, unfused structure 50 can be placed on the blade 40 or component, and heat can be applied until the binder is released and the molded structure 50 is fully fused to the blade 40 or component. The green state binder can be an organic binder that will be consumed during the fusing process and leave no residue behind. In the end, the blade 40 or component is allowed to cool and has a fully fused cutting structure 50 disposed thereon.

Once fused, the fused layer 60 can have one of several forms. In FIG. 4A, three examples are shown for comparative purposes. For example, a fused layer 61*a* can include tungsten carbide powder in the braze alloy matrix. In other examples, the fused layer 61*b-c* can include the tungsten carbide power in the braze alloy matrix along with tungsten carbide pieces of greater size.

As will be further appreciated, a fused structure 50 of the present disclosure formed with the fusible metal clay can replace traditional cutting structure for mills, cutters, and knives for downhole equipment. The fused structure 50 can also be used to replace hard banding and can facilitate the application of unique buttons or wear surfaces for specialized applications, such as stop collars, wear pads, contact buttons, etc. In fact, the fused structure 50 can be used in overlaying a surface, dressing a surface, adding a layer, adding a component structure, or making an integral part or component of a downhole tool or a portion thereof.

Figure 5:
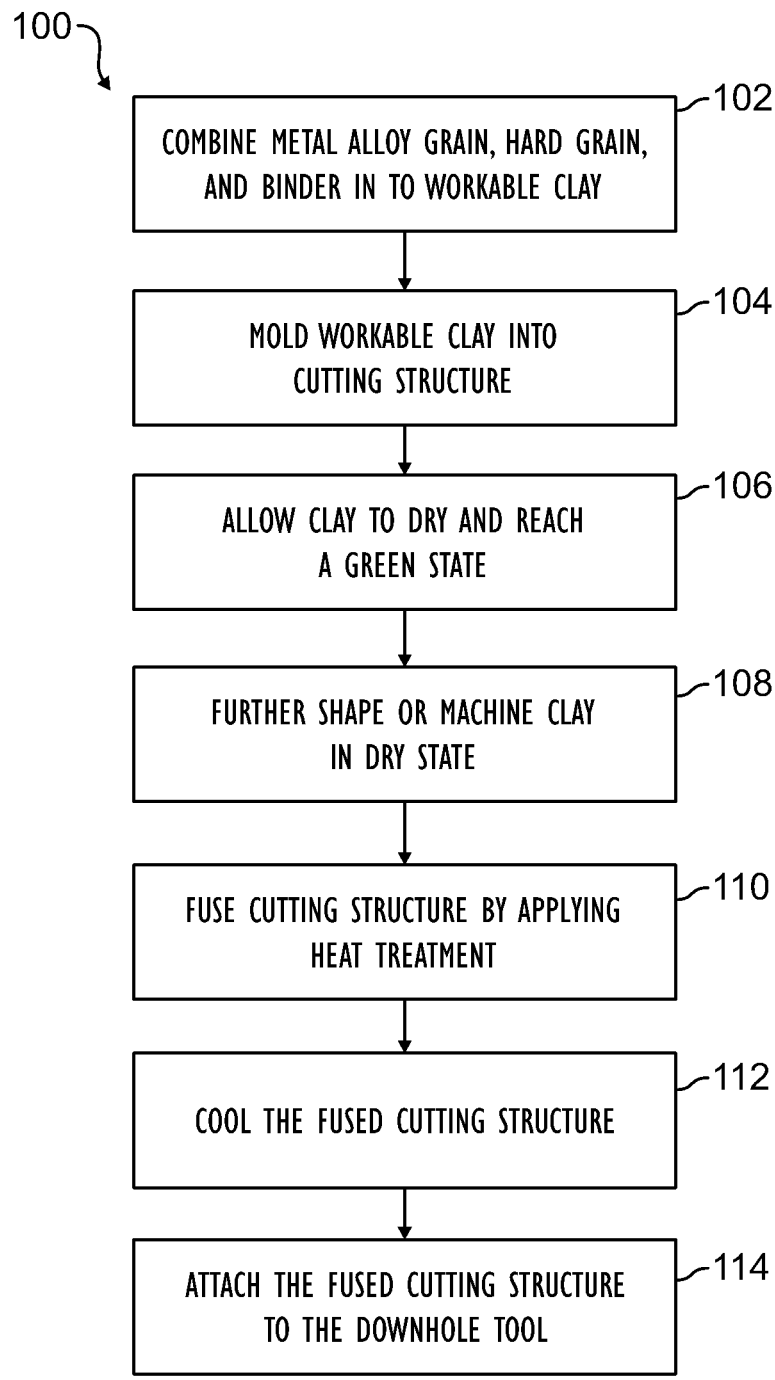
FIG. 5 illustrates a first process according to the present disclosure for constructing a structure of a fusible metal clay on a tool.

Looking at these techniques in further detail, FIG. 5 illustrates a first process 100 according to the present disclosure for constructing a structure (50) of the present disclosure for overlaying a tool. In general, the constructed structure (50) can be used to dress the downhole tool by dressing an interior and/or exterior surface of the downhole tool. As disclosed herein, for example, the constructed structure (50) can be used on an exterior of a tool as a portion of a blade, wear surface, wear pad, contact button, drilling bits, milling bits, stabilizers, rotary shoes, reamers, washover shoes, wear pads, under-reamer, and the like. In a similar fashion, the constructed cutting structure can be used on an interior of a tool, such as a shoe or other, for abrasive engagement downhole. Moreover, the overlaying can involve dressing a surface, adding a layer, adding a component structure, or making an integral part or structure of a downhole tool or a portion thereof.

A fusible grain, a hard grain, and a binder are combined into a malleable or workable metal clay (Block 102). In particular, the clay in a wet state is a malleable or workable combination comprising a fusible grain, a hard grain, and a binder. A flux agent may optionally be included.

For example, the fusible metal clay can be comprised of a braze alloy, a green state binder, and a tungsten carbide grain (e.g., powder). A flux agent can also be used. These are used to yield the initial properties of the moldable, wet clay having plasticity and durability of a green, dry state for handling and forming. The final fused state after a heat treatment completes the final product.

The fusible grain comprises alloying elements of a metal alloy having a first hardness and a first melting point. For example, the fusible grain can comprise a powder of metal alloy, such as a braze alloy; an alloy of nickel, copper, and cobalt; or a CuNi10 alloy with 90% copper and 10% nickel. The metal alloy grain can be selected to be compatible with the downhole environment and the materials to be joined. Additionally, the particle mesh size of the fusible grain can be selected based on the application, particular needs of an implementation, and what hard grain and binder are used.

By contrast, the hard grain comprises a hard, abrasive material having a second hardness greater than the first hardness of the metal alloy and having a second melting point higher than of the first melting point of the metal alloy. For example, the hard grain can comprise a powder, filler, frit, pieces, chips, fragments, particles, shapes, elements, chunks, or a combination thereof of the hard abrasive material. The particle mesh size of the hard grain can be selected based on the application, particular needs of an implementation, and what alloy grain and binder are used.

The hard abrasive material for the hard grain can include any one or combination of interstitial carbide, tungsten carbide, titanium carbide, polycrystalline diamond compact (PDC), thermally stable polycrystalline (TSP) diamond, diamond powder, an abrasive material, steel shavings or pieces, cubic boron nitride, and the like. For example, the interstitial carbide can be a carbide of group 4, 5 and 6 transition metals and especially can be tungsten carbide.

The binder binds the fusible grain and the hard grain together into the workable combination. The binder is initially in liquid form in a wet state to hold everything together wet. In a dry state, the binder holds the combination together long enough for the material to be heated and fused. The ratio of components are combined so the clay achieves a suitable consistency for the application, such as from a slurry to a mixture that can stand and hold shape without moving or sagging.

The binder is formulated to oxidize and be consumed and leave no residue or contamination for the final product. Therefore, the binder has a combustion temperature at least not greater than the first melting point of the fusible grain. For example, the binder can comprise a synthetic binder, an organic binder, a water-based binder, a polyurethane-based binder, an adhesive, a glue, and the like. Flowbind AC is an example of a water-based binder with adhesive Finally, the optional flux agent can be added to the clay. For example, a powder having borax can be used for the flux agent. The optional flux agent can be included in powder form to ensure adequate cleaning of materials and promote wetting of all surfaces. Some green state binders provide fluxing properties. An example of a flux agent is a borax/powdered based flux agent, such as Peterson Blue Flux #1.

The hard grain (e.g., tungsten carbide powder) is used to "load" the mixture, and the fusible and hard grains provide the desired plasticity in the wet state. The level of plasticity for the workable combination of the clay depends on a number of factors, such as a particle size, a percentage by volume, and a particle wettability of at least one or both of the fusible and hard grains relative to one or more characteristics of the binder. Additionally, the content/percentage by volume of the hard grain (e.g., tungsten carbide powder) provides substantial wear and abrasion resistance to the final structure 50 once formed.

In the process 100, the clay in a wet state is molded into a structure (50) having an appropriate geometry as disclosed herein (Block 104). For example, the clay in the wet state can be formed in a pre-defined mold having the geometry and shape for a structure, a portion of a blade, or the like. The clay in the wet state can be injected from a piston, such as a syringe device, caulk gun, or the like to form the structure. Also, the clay can be manually shaped and formed in the wet state into the structure. Depending on the application needs, plasticity of the clay can be adjusted from a slurry to a material having high plasticity resembling concrete or moldable clay.

In the molding of the clay, one or more prefabricated cutting elements can be embedded into the molded clay for applications requiring metal cutting. For example, the one or more prefabricated cutting elements can include one or more inserts composed of tungsten carbide that are pressed into the surface of the molded clay at appropriate locations, such as along a leading edge.

In the molding of the clay, the molded clay can be allowed to dry from the wet state to a dry state in which the molded clay becomes rigid (Block 106). Then, further machining, shaping, etching, smoothing, or other processing can be performed on the molded clay in the dry (green) state to produce the structure (Block 108).

In the process 100, the resulting structure (50) can be fused from the molded and shaped clay. A heat treatment is applied to the molded clay at least up to the first melting point of the fusible grain (e.g., metal alloy powder in the clay) (Block 110), and the fused structure (50) is then cooled to a hard component (Block 112). In the end, the fused structure (50) is attached to the downhole tool, surface, blade, component, etc. (Block 114).

Applying the heat treatment to the molded clay at least up to the first melting point in Block 110 can involve applying the heat treatment with induction heating, torch heating, furnace heating, resistance welding, combination of these, and other techniques disclosed herein. As noted, the melting point of the fusible metal alloy grain in the metal clay is below that of the hard grain in the clay, but the combustion temperature of the binder is not greater than the alloy's melting point. Thus, the heat treatment ramps up temperature to begin combustion of the binder and melting the fusible metal alloy to fuse with the hard grain, which is heated but not necessarily melted.

The binder holds the form of the structure (50) during the heating until the fusible metal alloy grain begins to fuse. Cooling the fused structure ramps rapidly down so that the form of the structure is maintained without too much deformation in shape. Overall, the structure (50) is expected to shrink in the heating and cooling process. In the end, the fused structure includes the hard abrasive grain suspended in the metal alloy matrix without any considerable remainder of binder.

The fused structures (50) can therefore be produced as a consistent component, with multiple structures (50) being fabricated at one time for assembly on a cutting tool (30), blades (40), and the like. The fused structure (50) can be attached to the cutting tool (30) as at least the portion of the blade (40) in a number of ways. For example, the fused structure (50) can be brazed to a backing plate of the blade (40) or can be brazed as a primary structure for the blade (40). Attaching the fused structure (50) to the tool (30) or blade (40) can used conventionally brazing techniques, brazing paste, adhesive, and fixtures.

Figure 6:
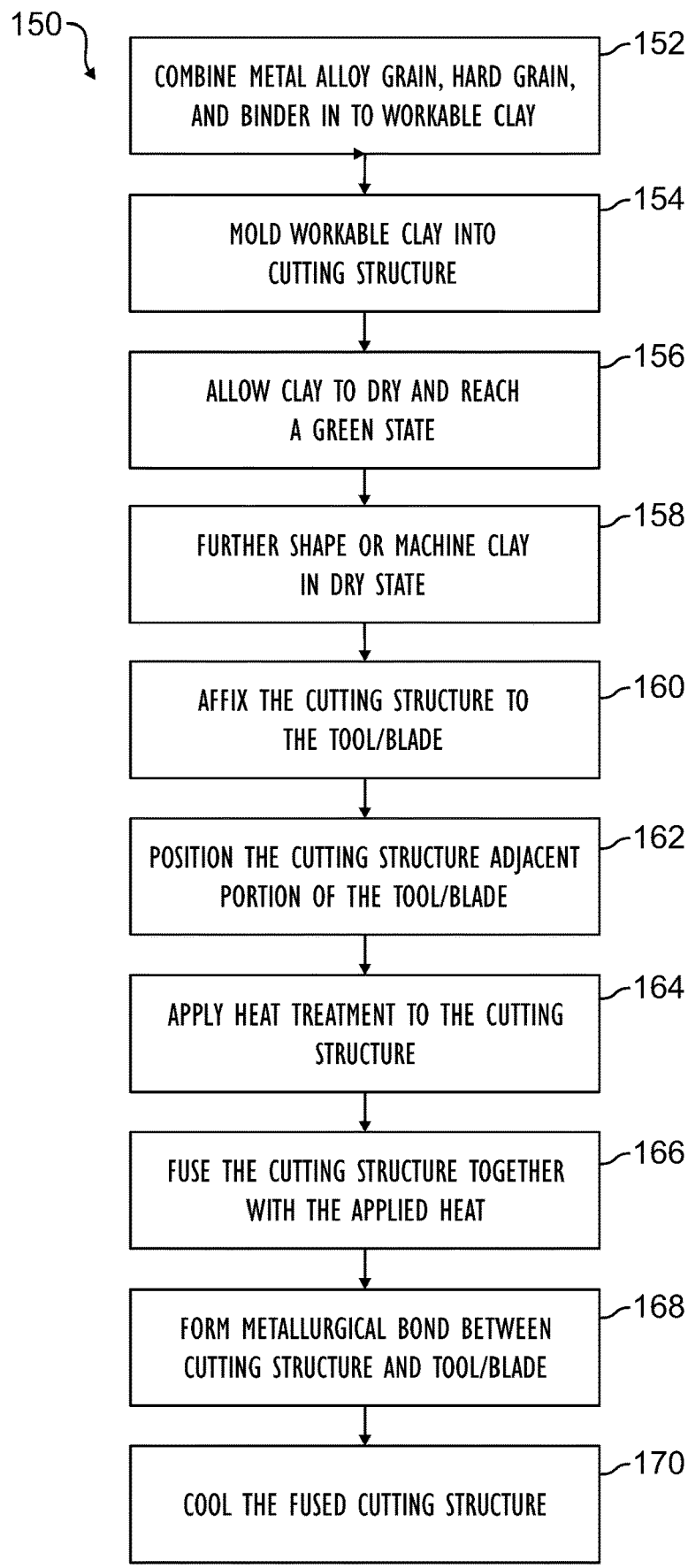
FIG. 6 illustrates a second process according to the present disclosure for constructing a structure of a fusible metal clay on a tool.

FIG. 6 illustrates a second process 150 according to the present disclosure for constructing a structure (50) of the present disclosure for overlaying on a tool (30), blade (40), a surface, component, etc. In general, the constructed structure (50) can be used to dress the downhole tool by dressing an interior and/or exterior surface of the downhole tool. As disclosed herein, for example, the constructed structure (50) can be used on an exterior of a tool as a portion of a blade, wear surface, wear pad, contact button, drilling bits, milling bits, stabilizers, rotary shoes, reamers, washover shoes, wear pads, under-reamer, and the like. In a similar fashion, the constructed structure (50) can be used on an interior of a tool, such as a shoe or other, for abrasive engagement downhole. Again, the overlaying can involve dressing a surface, adding a layer, adding a component structure, or making an integral part or component of a downhole tool or a portion thereof.

Again, a fusible grain, a hard grain, and a binder are combined into a workable clay (Block 152). In particular, the metal clay in a wet state is a malleable or workable combination comprising a fusible grain, a hard grain, and a binder. A flux agent may optionally be included. Details of these components can be similar to those discussed above.

In the process 100, the metal clay in a wet state is molded into a structure (50) having an appropriate geometry as disclosed herein (Block 154). For example, the metal clay in the wet state can be formed in a pre-defined mold having the geometry and shape for a structure (50), portion of a blade (40), or the like. The metal clay in the wet state can be injected from a piston, such as a syringe device, caulk gun, or the like to form the structure. Also, the metal clay can be manually shaped and formed in the wet state into the structure.

In the molding of the metal clay, one or more prefabricated cutting elements can be embedded into the molded clay. For example, the one or more prefabricated cutting elements include one or more inserts (70) composed of tungsten carbide that are pressed into the surface of the molded clay at appropriate locations, such as along a leading edge.

In the molding of the metal clay, the molded clay can be allowed to dry from the wet state to a green (dry) state (Block 156). Then, further machining or shaping the molded clay can be performed in the dry state to produce the structure (50) (Block 158).

As noted in the previous process 100, the molded structure (50) is first fused for later affixing to the tool or portion thereof. For example, the molded and fused structure (50) can form a portion of the blade (40) and can be brazed on a back plate of the blade (40).

In the current technique, however, the process 150 affixes the structure (50) in a fusible state to the tool (30) or blade (40) (Block 160). For example, the fusible structure (50) can be pre-molded and placed in a fusible state on a portion of the tool (30) or blade (40) for affixing thereto in a heating process. Alternatively, the fusible structure (50) can molded directly onto a portion of the tool (30) or blade (40) and can be adhered directly thereto in a heating process.

To affix the fusible structure (50), a portion of the tool (30), blade (40), etc. can be prepped, and the fusible structure (50) can be positioned adjacent the prepped portion (Block 162). The preparation can involve pre-tinning a substrate surface of the portion of the tool (30) or blade (40) so that a base surface of the fusible structure (50) can be placed adjacent the tinned substrate surface. As will be appreciated, pre-tinning involves wetting or coating the surface with alloying elements in preparation of further fusing.

With the fusible structure (50) positioned adjacent the prepped portion, a heat treatment is applied to the fusible structure (50) at least up to the first melting point of the fusible grain (Block 164). With the applied heat treatment in this step, the structure (50) fuses together (Block 166), and a metallurgical bond is formed between the structure (50) with the prepped portion of the tool (30) or blade (40) (Block 168). In the end, the fused structure (50) is then cooled to a hard component on the blade or tool (Block 170).

As before, applying the heat treatment to the molded metal clay at least up to the first melting point in Block 164 can involve applying the heat treatment with induction heating, torch heating, furnace heating, resistance welding, and the like as disclosed herein. As noted, the melting point of the fusible metal alloy grain in the metal clay is below that of the hard grain in the metal clay, but the combustion temperature of the binder is not greater than the alloy's melting point. Thus, the heat treatment ramps up temperature to begin combustion of the binder and melting the fusible metal alloy to fuse with the hard grain, which is heated but not necessarily melted. The binder holds the form of the structure (50) during the heating until the fusible metal alloy grain begins to fuse. Cooling the fused structure (50) ramps rapidly down so that the form of the structure (50) is maintained without too much deformation in shape. Overall, the structure (50) is expected to shrink in the heating and cooling process. In the end, the fused structure (50) includes the hard abrasive grain suspended in the metal alloy matrix without any considerable remainder of binder.

Figure 7A:
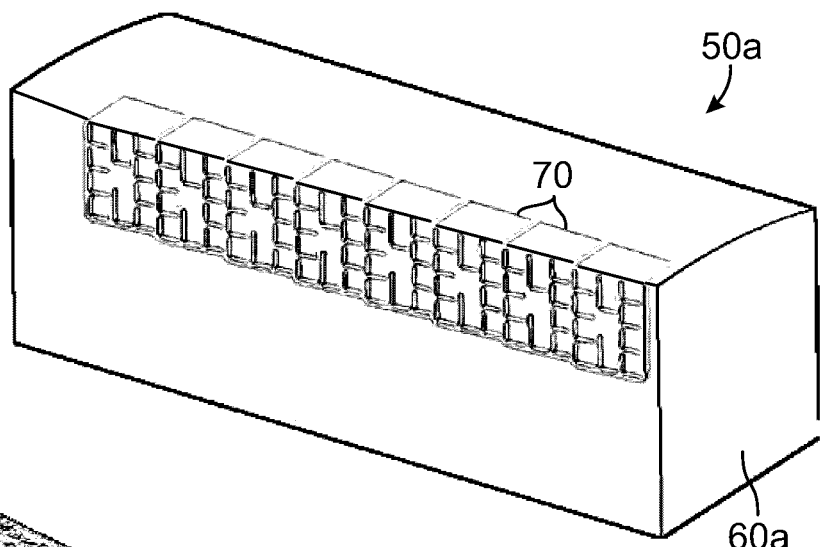
FIG. 7A illustrates a first example of a structure according to the present disclosure.

In one arrangement, the structure is formed from the fusible metal clay having embedded carbide inserts. For example, FIG. 7A illustrates a first example of a structure 50a according to the present disclosure. The structure 50a includes the fusible metal clay formed into a fusible element 60a. The clay of the element 60a can include the alloying elements, hard grain, and binder (along with any optional flux agent), and the clay element 60a can be formed into a desired geometry, which is generally represented here. Prefabricated cutting inserts 70 can be embedded in the clay element 60a, such as along a cutting edge. This clay element 60a of the structure 50a can be fused together in a heating process for later attachment to a portion of a tool or blade, or the clay element 60a in its green state can be fused to a portion of a tool or blade in a heating process. For example, a side of the clay element 60a can be placed against a prepared surface of a tool or blade to fuse thereto.

Figure 7B:
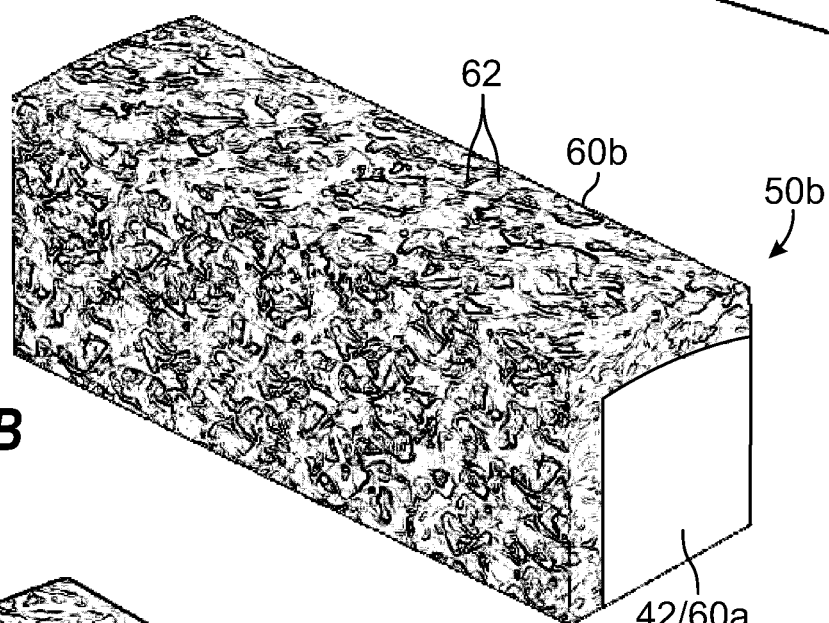
FIG. 7B illustrates a second example of a structure according to the present disclosure.

In another arrangement, the structure includes the fusible metal clay with embedded carbide pieces. For example, FIG. 7B illustrates a second example of a structure 50b according to the present disclosure. The structure 50b includes the fusible metal clay formed into a fusible element 60b. Here, the clay of the element 60b can include the alloying elements, hard grain, and binder (along with any optional flux agent), and the element 60b can further includes pieces 62 of the hard grain. Such pieces 62 can be chunks or shapes of tungsten carbide or the like.

In one example, the clay element 60b with pieces 62 can be formed into the desired geometry directly onto a portion 42 of a blade or tool and can be fused in its green state directly to the portion 42 in a heating process. In an alternative, the clay element 60b with pieces 62 can be formed into the desired geometry on fusible metal clay formed into a base fusible element 60a. Here, the clay of the base element 60a can include the alloying elements, hard grain, and binder (along with any optional flux agent) without pieces. This structure 50b can be fused together in a heating process for later attachment to a portion of a tool or blade, or the structure 50b in its green state can be fused to a portion of a tool or blade in a heating process.

Figure 7C:
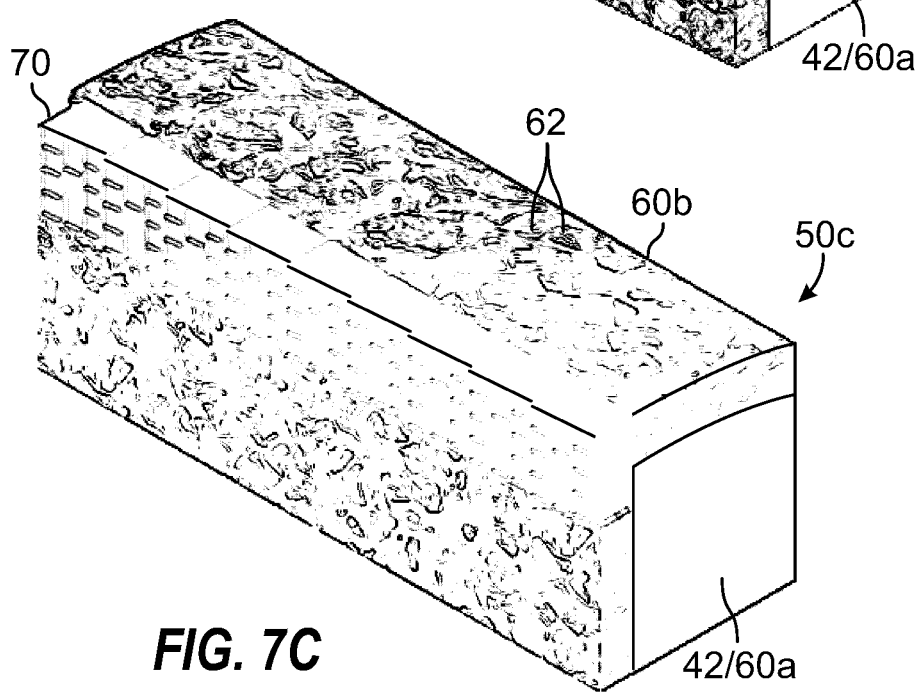
FIG. 7C illustrates a third example of a structure according to the present disclosure.

In yet another arrangement, the structure includes the fusible metal clay with embedded carbide inserts and pieces. For example, FIG. 7C illustrates a third example of a structure 50c according to the present disclosure. The structure 50c includes the fusible metal clay formed into a fusible element 60b. Here, the clay of the element 60b can include the alloying elements, hard grain, and binder (along with any optional flux agent), and the element 60b can further includes pieces 62 of the hard grain. Additionally, prefabricated cutting inserts 70 can be embedded in the clay element 60b, such as along a cutting edge.

In one example, the clay element 60b with pieces 62 and inserts 70 can be formed into the desired geometry directly onto a portion 42 of a blade, a tool, or the like and can be fused in its green state directly to the portion 42 in a heating process. In an alternative, the clay element 60b with pieces 62 and inserts 70 can be formed into the desired geometry on fusible metal clay formed into a base fusible element 60a. Here, the clay of the element 60a can include the alloying elements, hard grain, and binder (along with any optional flux agent) without pieces. The structure 50c can be fused together in a heating process for later attachment to a portion of a tool or blade, or the structure 50c in its green state can be fused to a portion of a tool or blade in a heating process.

As noted above, a molded, fusible structure (50) composed of the metal clay is heated in a heating process to fuse the structure (50) into a fused structure (50) for later attachment to a tool, blade, or the like or to fuse the structure (50) directly onto the tool, blade, or the like. Fusing methods include furnace heating, induction heating, torch applications, and resistance welding.

Figure 8:
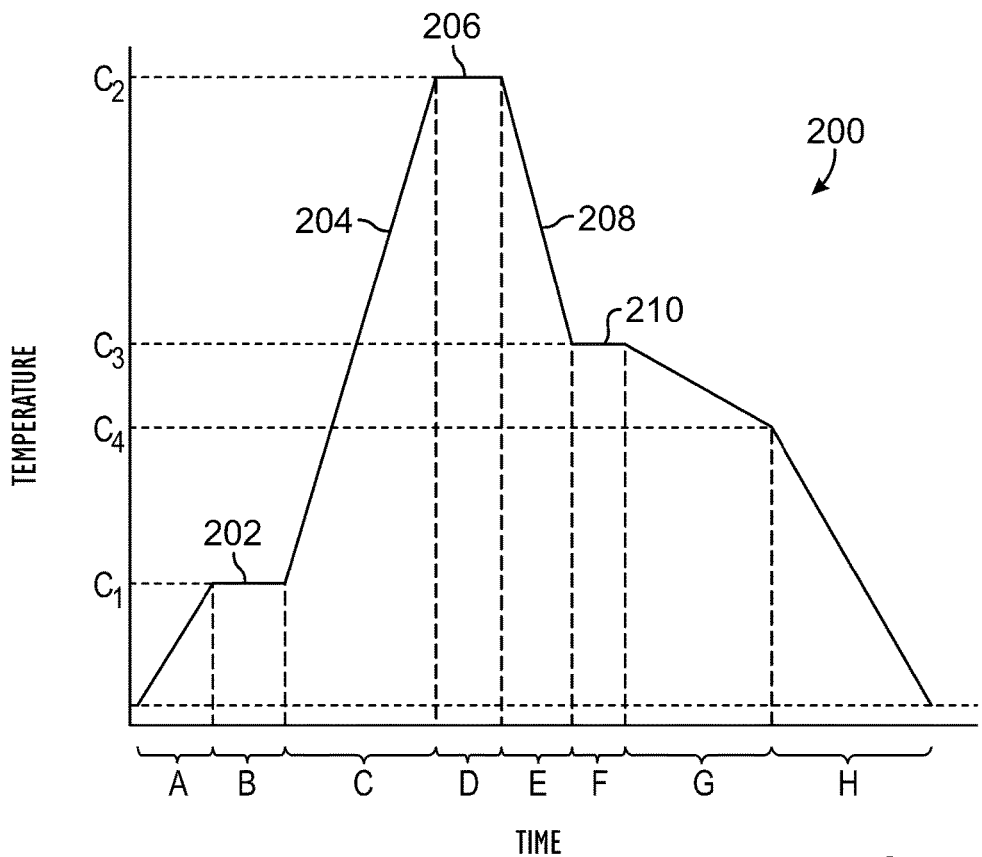
FIG. 8 graphs a heating process for fusing a structure of the present disclosure from the fusible metal clay.

Depending on the method, the heating process can use a specified heat treat cycle defining a heat treat curve for time versus temperature to achieve best performance. FIG. 8 graphs a heating process 200 for fusing a structure of the present disclosure from the molded clay.

This heating process 200 can be best suited to furnace or induction heating. In the heating process 200, for example, the molded clay element in its green state can be heated gradually while the binder holds the fusible and hard grains together during the heating process. For example, a heating time A ramps up the temperature from ambient to a first preheat temperature C1 at a preheat stage 202, at which the heat is sustained for a period B. Then, over the course of a time period C, the temperature is increased rapidly in a heating stage 204 to an elevated temperature C2 that melts the alloying elements.

The binder in the fusible element reaches its combustion temperature in the heating stage 204 at a temperature between C1 and C2. The particular temperature can depend on the melting point of the alloying elements of the fusible grain and how the grains can retain the shape of the structure with or without the binder present. In one example, the binder can combust or burn-off at a combustion temperature between 800 F and 1,100 F with little residual component being left. The alloying elements, however, would be heated at least until a liquidus phase is achieved at the melting temperatures C2. This may be held for melting stage 206 for a brief time D.

A cooling stage 208 can then follow with rapid cooling over a time E to lock in the shape of the structure. The cooling stage 208 is done before cutting element loses shape definition. After cooling, the fused structure can be held in a relief stage 210 at a stress relieve temperature C3 for a period F. This relief stage 210 allows stresses in the cooled structure to be relieved. After the relief temperature, the cutting element can be slow cooled to a following temperature C4 over a longer period G. Finally, the structure can cool to ambient temperature. The result is a homogeneous structure with no residual trace of the green state binder component.

As disclosed herein, use of a pre-molded structure eliminates variation and the application time required to orient the structures. With the pre-molded structure, the entire cutting surface can be set and fused in place in one shot. This form of fabrication is applicable for several techniques to fuse and affix the structure to a portion of a blade or to a tool. For instance, furnace heating, induction heating, or torch heating can be used.

In addition to these methods, the present techniques can use a resistance welding technique similar to what is used in wire fed metal inert gas (MIG) welding. In the resistant welding technique for the present disclosure, the welder scans a conforming electrode across the surface of the structure in a continuous motion to fuse and affix the structure in place. The conforming electrode completes an electrical circuit between the tool body, blade, etc. and the applied pre-molded structure resulting in localized fusing/brazing of the material. The conforming electrode can be composed of a carbon fiber brush, a compliant conductive material, and/or conductive fluid such as a gas or liquid. The conductors can also be consumable in the process. The geometry of the electrode is preferably able to conform to irregular surfaces and maintain electrical continuity as it travels across the surface. This will produce a continuous arc for fusing.

Figure 9:
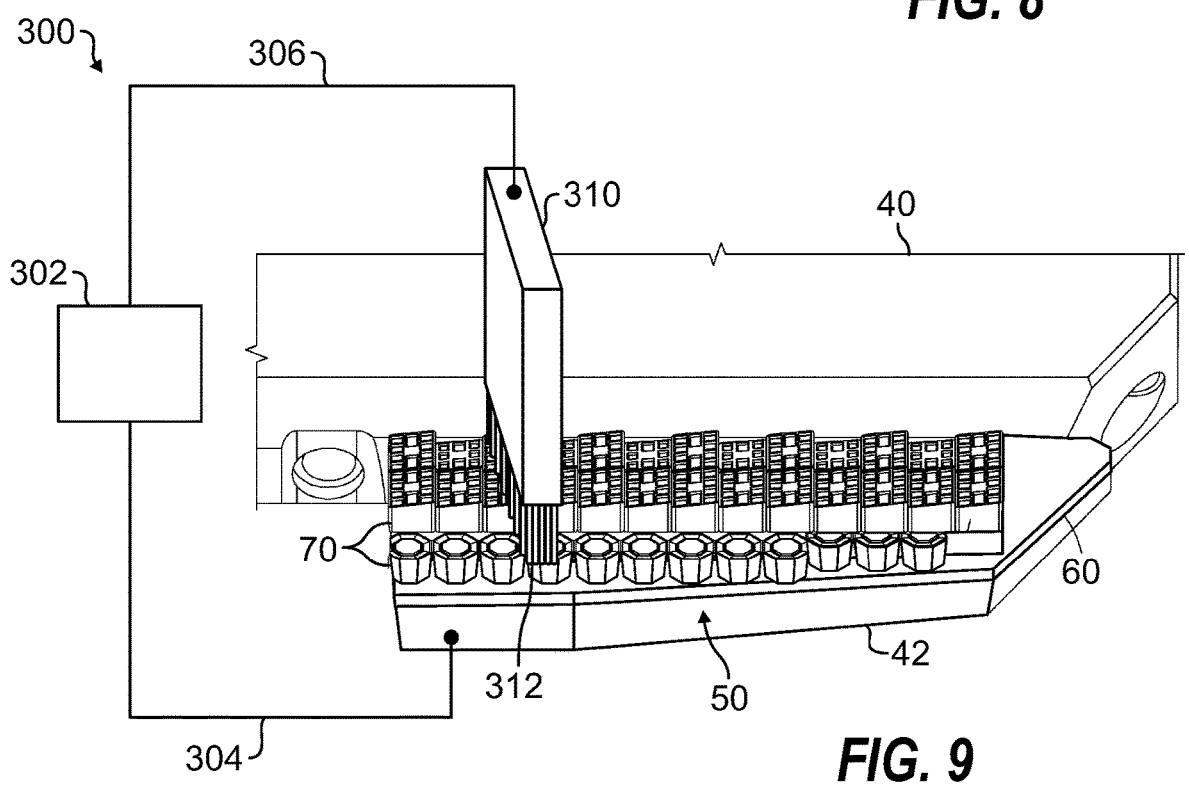
FIG. 9 illustrates a heating system for fusing a structure of the present disclosure to a portion of a blade or a tool.

For example, FIG. 9 illustrates a heating system 300 for fusing a structure 50 of the present disclosure to a portion of a blade or a tool. In this example, the structure 50 includes a molded, fusible element 60 of the metal clay disposed adjacent a surface of a backing plate 42 of a blade 40. As noted herein, the plate's surface can be appropriately prepared with brazing paste, flux agent, etc. The structure 50 in this example also includes pre-fabricated inserts 70 embedded in the metal clay of the fusible element 60.

The heating system 300 includes an electrical power source 302 having first and second electrodes 304 and 306. The first (grounding) electrode 304 connects to a metal portion of the blade or tool. Here, the grounding electrode 304 connects to the backing plate 42 of the blade 40. The second electrode 306 has a conforming electrode 310 that can be passed over the structure 50 to fuse the element 60 and inserts 70 and to affix them to the backing plate 42 of the blade 40.

The conforming electrode 310 produces a continuous arc for fusing the structure 50 as a carbon fiber brush 312, a compliant conductive material, or the like of the electrode 310 is moved across the irregular surface of the structure 50. Conductive fluids can be sprayed onto the surface of the molded structure 50 to complete the electrical path. The brush 312 maintains electrical continuity between the conforming electrode 310 and the irregular surface as the electrode 310 is moved across the irregular surface of the structure 50.

There are numerous advantages in this heating process to fuse such a pre-molded structure 50. Heat can be applied using electricity so the need for heat from a flame is eliminated. The pre-molded structure 50 can be scanned by the conforming electrode 310 and fused very quickly by the welder.

As noted in the background of the present disclosure, tradition mill brazing requires a skilled welder to preheat the mill body and apply composite crushed carbide material to selected cutting surfaces for the mill. This process is labor intensive and leaves the burden of consistency on the individual welder. This makes each brazed component essentially a work of art with varied cutting performance.

Here, the ability to apply the entire structure to a blade or tool at one time and fuse it in place eliminates most of the manual labor. Fabricating time can be reduced from several hours to much less time without loss of quality. Variation between structures can be eliminated if pre-formed molds are used to manufacture the green state structures consistently. In the end, cutting performance of the structures is normalized across fabrication facilities.

The techniques of the present disclosure can be used to add wear resistant or metal structures to existing tools and to new tools. Structures and combination of cutting/support structures can be fabricated as milling blades, cutter knives, wear pads, and other specialized surfaces.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of overlaying a downhole tool for engagement downhole, the method comprising:
    molding a clay in a wet state into a structure, the clay in the wet state being a workable combination comprising a first grain, a second grain, and a binder, the first grain comprising a metal alloy having a first hardness and a first melting point, the second grain comprising a second material, the second material having a second hardness greater than the first hardness of the metal alloy and having a second melting point higher than of the first melting point of the metal alloy, the binder binding the first and second grains into the workable combination and having a combustion temperature at least not greater than the first melting point; and
    affixing the structure to the downhole tool by:
        positioning the structure in a fusible state adjacent the downhole tool;
        applying a heat treatment to the structure at least up to the first melting point;
        fusing the structure together with the applied heat treatment; and
        forming a metallurgical bond between the structure with the downhole tool with the applied heat treatment.

2. The method of claim 1, wherein the first grain comprising the metal alloy comprises a powder comprising: a braze alloy; an alloy of nickel, copper, and cobalt; an alloy of copper and nickel; or a CuNi10 alloy with 90% copper and 10% nickel.

3. The method of claim 1, wherein the second grain comprises a powder, frit, pieces, chips, fragments, particles, shapes, elements, chunks, or combination thereof having the second material.

4. The method of claim 1, wherein the second material comprises interstitial carbide, tungsten carbide, titanium carbide, polycrystalline diamond compact, diamond powder, abrasive material, cubic boron nitride, steel, or combination thereof.

5. The method of claim 1, wherein the binder comprises a synthetic binder, an organic binder, a water-based binder, a polyurethane-based binder, an adhesive, a glue, or a combination thereof.

6. The method of claim 1, wherein the clay further comprises a flux agent.

7. The method of claim 6, the flux agent comprises a powder having borax.

8. The method of claim 1, wherein a level of plasticity for the workable combination depends on a particle size, a percentage by volume, and a particle wettability of at least one of the first and second grains relative to one or more characteristics of the binder.

9. The method of claim 1, wherein molding the clay in the wet state into the structure comprises forming the clay in the wet state in a mold, injecting the clay in the wet state from a piston, or manually forming the clay in the wet state.

10. The method of claim 9, wherein molding the clay further comprises allowing the molded clay to dry from the wet state to a dry state; and further machining or shaping the molded clay in the dry state.

11. The method of claim 1, wherein molding the clay further comprises embedding one or more prefabricated cutting elements in the molded clay.

12. The method of claim 11, wherein the one or more prefabricated cutting elements comprises one or more inserts composed of tungsten carbide.

13. The method of claim 1, wherein applying the heat treatment to the molded clay at least up to the first melting point comprises applying the heat treatment with induction heating, torch heating, furnace heating, resistance welding, or combination thereof.

14. The method of claim 13, wherein cooling the fused structure comprises cooling to a relief temperature, holding the relief temperature for a time period, and subsequently cooling below the relief temperature.

15. The method of claim 1, wherein positioning the structure adjacent the exterior of the downhole tool comprises tinning a substrate surface of the exterior of the downhole tool; and placing a base surface of the structure adjacent the tinned substrate surface.

16. The method of claim 1, wherein applying the heat treatment to the structure at least up to the first melting point comprises applying induction heating, applying torch heating, furnace heating, resistance welding, or a combination thereof.

17. The method of claim 1, wherein applying the heat treatment to the structure at least up to the first melting point comprises applying resistance welding by scanning the structure with a conforming electrode.

18. The method of claim 17, wherein scanning the structure by the conforming electrode comprises producing a continuous arc for fusing by:
moving the conforming electrode having a carbon fiber brush, a compliant conductive material, and/or a conductive fluid across an irregular surface of the structure; and
maintaining electrical continuity between the conforming electrode and the irregular surface as the conforming electrode moves across the irregular surface.

19. A method of overlaying a downhole tool for engagement downhole, the method comprising:
molding a clay in a wet state into a structure, the clay in the wet state being a workable combination comprising a first grain, a second grain, and a binder, the first grain comprising a metal alloy having a first hardness and a first melting point, the second grain comprising a second material, the second material having a second hardness greater than the first hardness of the metal alloy and having a second melting point higher than of the first melting point of the metal alloy, the binder binding the first and second grains into the workable combination and having a combustion temperature at least not greater than the first melting point;
fusing the structure by applying a heat treatment to the molded clay at least up to the first melting point;
cooling the fused structure; and
attaching the fused structure to the downhole tool.

20. A downhole tool dressed by a method of overlaying the downhole tool for engagement downhole, the method comprising:
molding a clay in a wet state into a structure, the clay in the wet state being a workable combination comprising a first grain, a second grain, and a binder, the first grain comprising a metal alloy having a first hardness and a first melting point, the second grain comprising a second material, the second material having a second hardness greater than the first hardness of the metal alloy and having a second melting point higher than of the first melting point of the metal alloy, the binder binding the first and second grains into the workable combination and having a combustion temperature at least not greater than the first melting point; and
affixing the structure to the downhole tool by:
positioning the structure in a fusible state adjacent the downhole tool;
applying a heat treatment to the structure at least up to the first melting point;
fusing the structure together with the applied heat treatment; and
forming a metallurgical bond between the structure with the downhole tool with the applied heat treatment.

* * * * *